R. M. ROBINSON.
Fare-Boxes.

No. 158,981.  Patented Jan. 19, 1875.

2 Sheets--Sheet 1.

Witnesses:
L. F. Brous.
A. P. Grant.

Inventor:
R. Miles Robinson
by John A. Wiedersheim
Att'y

2 Sheets--Sheet 2.
R. M. ROBINSON.
Fare-Boxes.
No. 158,981. Patented Jan. 19, 1875.
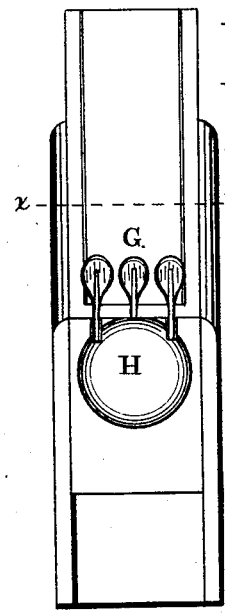
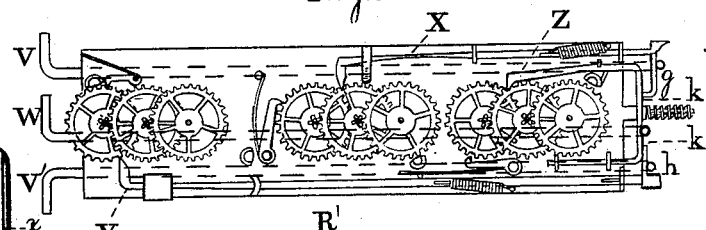
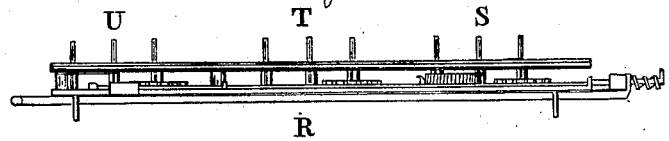
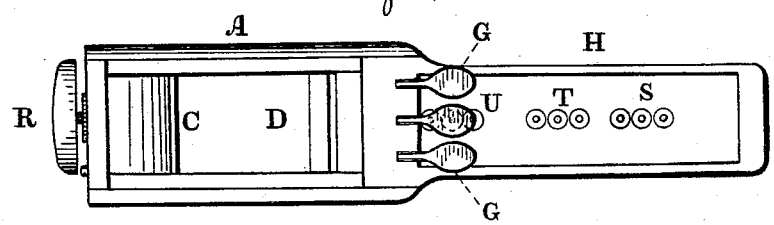
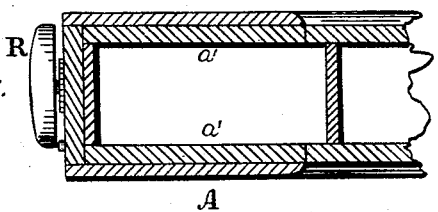
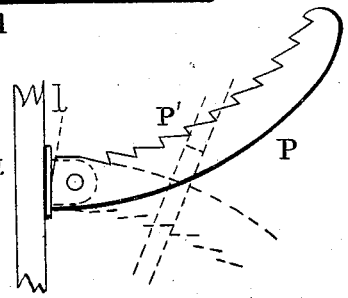
Witnesses:
L. F. Brous.
A. P. Grant.
Inventor:
R. Miles Robinson.
by John A. Wiedersheim.
Atty

UNITED STATES PATENT OFFICE.

R. MILES ROBINSON, OF PHILADELPHIA, PENNSYLVANIA.

IMPROVEMENT IN FARE-BOXES.

Specification forming part of Letters Patent No. 158,981, dated January 19, 1875; application filed October 9, 1874.

CASE A.

*To all whom it may concern:*

Be it known that I, R. MILES ROBINSON, of the city and county of Philadelphia and State of Pennsylvania, have invented a new and useful Improvement in Fare-Boxes; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
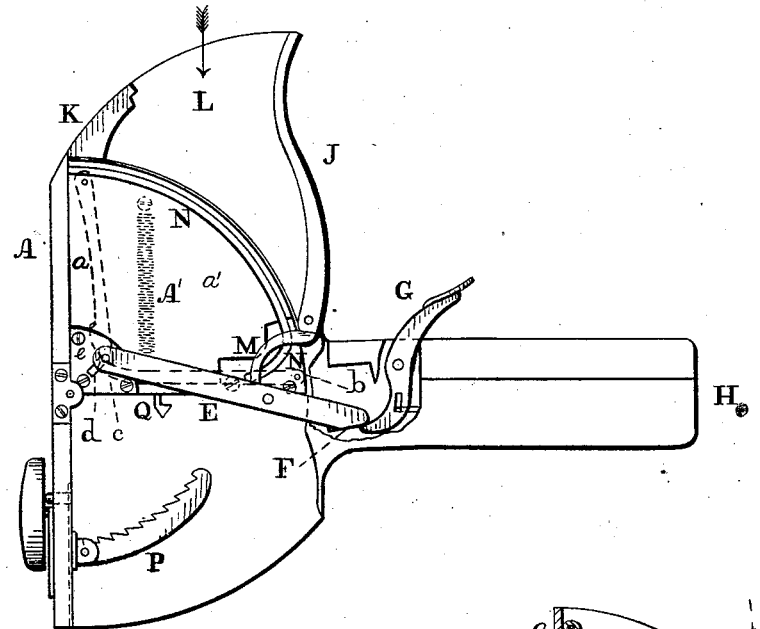
Figure 3:
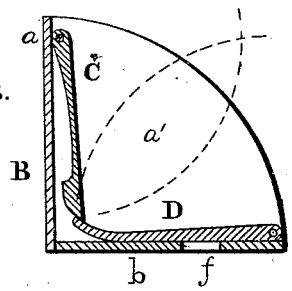
Figure 2:
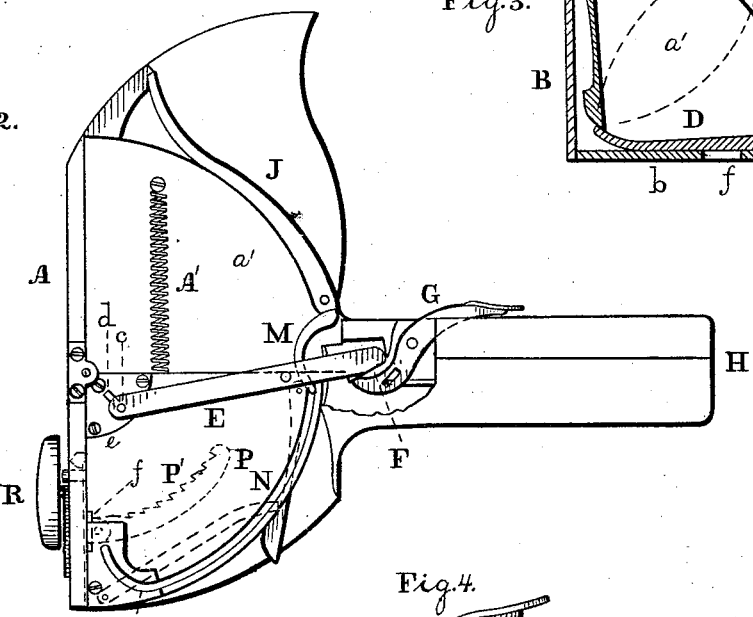
Figure 4:
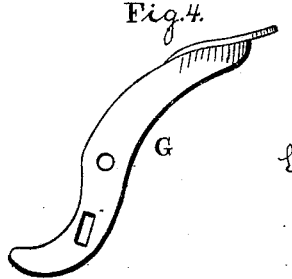

Figure 1 is a side view of the interior of the device embodying my invention. Fig. 2 is a similar view, showing the operation of parts. Fig. 3 is a vertical section of the trap and leaves. Fig. 4 is a side view of one of the operating triggers or levers. Fig. 5 is a rear view of Fig. 1. Fig. 6 is a top view thereof. Fig. 9 is a transverse section in line $x\ x$, Fig. 5. Fig. 10 is a detached view of a ratchet or dog, to be hereinafter more fully referred to.

My invention consists in an axial leaf, which is constructed of two plates, having side walls, and the body of the receiver having on its inner face curved recesses, into which the walls of the body are received. It also consists in an angular fare-receiving leaf, which carries a trap or traps, which insure the discharge of the fare into the body of the receiver, and prevent the return or extraction thereof, the discharge being reliable whether the fare is specie, currency, tickets, or otherwise. It also consists in a door, which closes the hopper or mouth of the receiver on the discharging motion of the leaf, and opens the same on the return motion of said leaf. It also consists in an overhanging piece, forming part of the hopper, and having the door close against it. It also consists in operating arms or levers for the leaf. It further consists of a dog, which operates the traps on the descent of the fare-receiving leaf, to insure the discharge of the fare, and to hold the traps in such a manner that the fare cannot pass the same on overturning of the receiver. It also consists in serrations on the dog, for locking the leaf when the receiver is overturned. It also consists in so operating the gong that it will be sounded only after a fare has been registered and discharged in the proper receptacle therefor.

Referring to the drawings, A represents the body of the receiver, which is in the form of a receptacle or chamber, and within the same is hinged a leaf, B, which is of angular form, or constructed of two plates, $a\ b$, united to each other at or about right angles, the angle being at the axis of the trap, and the plate $a$ standing vertically and the plate $b$ horizontally, and having side walls, $a'$, whose edges are curved, so that the leaf may be said to be of pyramidal form, the lines of whose base being curved, or the arc of a circle. The side walls of the leaf are fitted in spaces on the inner faces of the receiver, so that said walls are flush with said faces. (See Fig. 9.) From the upper or outer end of the vertical plate $a$ there is suspended a hinged trap, C, and to the outer end of the horizontal plate $b$ there is hinged a trap, D, which, when the leaf B is in its normal position, rests on the plate $b$, the bottom of the trap C coming over the upper side of said trap D. E represents arms or levers, which are hinged to or mounted on the sides of the body A, and at one end to the sides of the leaf B, said arms or levers having pins $c$, which enter slots $d$ in plates $e$, secured to the said sides of the leaf B at the axis portion thereof. The arms E, at the ends opposite to those carrying the pins $c$, are united by a cross-bar, F, forming a bearing-plate for a series of triggers or levers, G, which are pivoted to an extension of the body A, or to the forward portion of the handle H, by which the receiver is to be carried.

To the body A, at the side or end opposite to the axial connection of the leaf B, there is jointed a door, J, which extends upwardly, and when in its normal position leaves the top of the body open or uncovered, so that with a piece, K, overhanging the top of the plate $a$ of the leaf B, the hopper or mouth L of the receiver is formed. To the axial portion of the door J there is secured an arm, M, (or one for each side,) whose end is bent inwardly, or has a pin formed therewith or secured thereto, said end or pin entering a cam-groove, N, which is formed in the side of the leaf B, and extends along the circumferential edge of said side. On the inner face of the receiver, below the leaf B, there is hinged a dog, P, which is of curved or angular form, and extends upwardly, and is adapted to enter an opening, $f$, formed in the horizontal plate $b$ of the leaf B, the entrance being accomplished when the leaf is depressed, as will be hereinafter more fully stated. The upper face of the dog P is formed with serrations P′, for purposes to be stated.

A dog, Q, is hinged to the leaf B, and so located that at a certain time it will engage with the hammer of a suitably arranged gong, R, but only sound the latter after a fare has been registered and discharged into a proper portion of the receiver.

The registering mechanism R′ is located in the handle H of the apparatus, said handle being hollowed to receive the same. S represents a series of dials for indicating the whole number of fares of all kinds; U, a series similarly for half-fares, and T for exchange tickets; but the number of series may be extended or multiplied according to the variety of collections the conductor may be required to make. V W V′ represent a number of sliding rods, which are mounted on the main plate of the registering mechanism, or adjacent portion of the inner face of the hollow or tubular handle H. One end of each of these rods is bent, hooked, or otherwise constructed to engage with the triggers or levers G.

The other end of each of the levers is connected to mechanism that operates the registering apparatus as follows: The side rod V bears against a transverse arm, $g$, of a dog, X, which engages with the wheels of the center dials, T. The side rod V′ bears against a transverse arm, $h$, of a dog, Y, which engages with the wheels of the dials U. The dogs X Y are sufficiently long to reach the respective wheels. The central rod, W, bears against a transverse arm, $k$, of a dog, Z, which engages with the wheels of the dials S. The arm $k$ is somewhat U or double L shape, so that both the arms $g$ and $h$ of the dogs X Y will bear against the arm $k$ of the dog Z, so that when the dogs X Y are operated the dog Z will also be operated, but the dog Z is operated without operating the dogs X Y. The triggers or levers G may, however, be connected directly to the arms that carry the dogs which move the dials, so as to dispense with the rods V W V′. The conductor, grasping the handle H, presents the receiver to the passenger, who will deposit his fare in the hopper L, said fare then falling on the trap D, which, as has been stated, rests on the horizontal plate $b$ of the leaf B.

The conductor then inspects the fare thus received, the door J and the sides of the receiver being partly constructed of transparent material to permit such inspection. Should the fare prove to be a full fare, the conductor presses the center trigger or lever of the series G, which operates the dials S, thus recording said full fare. Should the fare prove to be a half-fare, the conductor presses the side trigger of the series G, which will be properly designated half-fare, thus operating the dial U, which, in the present case, will be employed for half-fares.

In the operation of registering the half-fare it will be observed that the dials S will be simultaneously operated, this being accomplished by the action of the arm $h$ of the dog Y on the transverse arm $k$ of the dog Z, thus recording said half-fare upon the dial S as well as upon the dial U.

Should the fare, upon inspection, prove to be an exchange fare or ticket, or some special fare other than full or half, the conductor will depress or operate the trigger of the series designated in this case for exchange tickets or other special fare, thus operating the dial T, which, in the present case, will be employed for exchange tickets or the special fare. Simultaneously with this movement, the said fare will also be recorded upon the dial S, owing to the arm $g$ bearing against the arm $k$ of the dog Z, and imparting movement to said dog Z.

It will now be observed that there may have been received three fares—one a full fare, one a half-fare, and the other an exchange ticket or special fare. The dial S records three fares, the dials U and T each one fare respectively. The exact number of full fares that have been received are now to be ascertained by subtracting the sum of the dials U and T from the number of fares specified by the dial S.

It may be remarked that the dial S may be called the sum-dial, on which all fares of all descriptions will be registered, the characters of the sums being determined by the two other dials. It will also be noted that the conductor, in recording a half-fare, may press the designated trigger for full fare with the trigger designated exchange ticket or other fare, and, as well, in case of receiving a half-fare, the trigger marked full fare, in conjunction with the trigger marked half-fare, or separately, as desired.

When the triggers are thus operated for registering or recording the fare, the cross-bar F of the levers E, being pressed upward by the triggers, causes the opposite end of the said levers to descend, which, being jointed to the axial portion of the leaf B, quickly depresses said leaf B, whereby the plate $b$ will assume a vertical position, and the plate $a$ a horizontal position, the fare being then discharged. In this movement the trap C swings outwardly from the plate $a$, and the trap D from the plate $b$. The dog P, entering the opening $f$ in the plate $b$, reaches the traps C D, and quickly forces them from their place of rest, thus making the outward motion of said traps positive at all times to sweep the fare clear of the sides of the receiver and the face of the leaf and traps, and thus insure the discharge of said fare. The fare having been registered and discharged at the moment of the lowest point of the leaf B, the dog Q reaches the hammer of the gong R, and engages therewith. The point has now been reached at which the operator releases the trigger to permit the leaf to return to its first position. Owing to the triggers not being held, the leaf B is now controlled by a spring, A', which, secured thereto in any suitable manner, causes the ascent or return motion of the leaf for the reception of the next fare. On this ascent or return motion of the leaf B the hammer of the gong is drawn back, and, when released from the dog, strikes the gong, and indicates to the passenger the fact that his fare has been recorded.

It will be noticed that when the leaf starts to descend, the door J closes with a quick motion against the overhanging piece K at the top of the receiver, thus sweeping the fare that may be partially protruding or sticking to the sides of the fixed part of the hopper onto the leaf B.

The rapid movement of the door, due to the sharp turn of the groove N in leaf B, closes the hopper L before the leaf B has assumed a position half-way in its descent, which would otherwise enable the extraction of fare, such opportunity for extraction being thereby prevented.

It will also be noticed that the continuation of the groove around the circumferential edge of the leaf B, and the end or pin of the arm M working in said groove, prevents the operator from lifting or opening the door J, since it is locked with the leaf B, and the door cannot be lifted or opened until the leaf returns to nearly its first position and the pin in the arm M has reached the sharp curve of the groove N, thus preventing all possibility of the abstraction of a fare while the leaf is upon its downward passage. The only mode of obtaining a registered fare is by overturning the receiver after having depressed the leaf B. This is prevented by the dog D falling, of its own weight, into the slot $f$ of the leaf B, and its serrations engage with the side of said slot, and thus lock the leaf and dog, whereby the leaf cannot return to its first position while the apparatus is inverted. When the apparatus is overturned the tendency of the traps C D is to fall inward upon the back of the dog; but the latter acts as a stop and limits the falling-in motion, thus preventing the return of the registered fare to the leaf B. At the same time the weight of the traps and of the fare resting thereon will be transmitted to the dog P, and thoroughly cause the teeth of the latter to take hold of the leaf B in the slot or opening $f$. The edge of the dog P adjacent to the part of the receiver to which it is pivoted is formed with a pin or shoulder, $l$, (see Fig. 9,) which prevents the dog, upon inverting the apparatus before depressing the leaf B, from falling against the side of the receiver to which it is attached. The registering apparatus or dials thereof are only accessible to the treasurer or authorized officer of the company by means of a combination or other lock. The side walls of the leaf B afford means for the location of the cam-groove N, by which the door J is operated, the attachment of the arms or levers E, and connection of the springs A', and, being set in flush with the inner faces of the hopper portion of the receiver, prevent any space between the door and the hopper, or between the curved edge of the leaf B and said door J.

Having thus described my invention, what I claim as new, and desire to secure by Letters Patent, is—

1. In a fare-receiver, the axial leaf B, constructed of two plates, $a\ b$, and side walls $a'$, in combination with the body A, having curved recesses on its inner face, and receiving the walls $a'$ therein, substantially as and for the purpose set forth.

2. The angular leaf B, in combination with the trap C, jointed to the outer end of the vertical plate $a$ of said leaf, and the trap D, jointed to the outer end of the horizontal plate $b$ thereof, substantially as and for the purpose set forth.

3. The axial door J, in combination with the axial leaf B, substantially as and for the purpose set forth.

4. The combination, with the receiver A and axial leaf B, of the overhanging piece K, forming part of the hopper L, and the door J, closing against said piece, substantially as and for the purpose set forth.

5. The arms or levers E, jointed to the axial portion of the leaf B, and operating in combination with the trigger or triggers G, substantially as and for the purpose set forth.

6. The dog P, in combination with the leaf B and the traps C D of said leaf, substantially as and for the purpose set forth.

7. The dog P, formed with serrations P', in combination with the leaf B, formed with an opening, $f$, and the traps C D, substantially as and for the purpose set forth.

8. The gong R, in combination with the leaf B, and operated thereby after the fare is registered, and discharged by means of the dog Q on the under side of the leaf, substantially as and for the purpose set forth.

R. MILES ROBINSON.

Witnesses:
JOHN A. WIEDERSHEIM,
JNO. A. BELL.